United States Patent
Bosma

(10) Patent No.: US 10,494,117 B2
(45) Date of Patent: Dec. 3, 2019

(54) PARALLEL HYBRID-ELECTRIC AIRCRAFT ENGINE

(71) Applicant: Marinus Bernard Bosma, Tipp City, OH (US)

(72) Inventor: Marinus Bernard Bosma, Tipp City, OH (US)

( * ) Notice: Subject to any disclaimer, the term of this patent is extended or adjusted under 35 U.S.C. 154(b) by 96 days.

(21) Appl. No.: 15/677,005

(22) Filed: Aug. 14, 2017

(65) Prior Publication Data

US 2019/0047720 A1   Feb. 14, 2019

(51) Int. Cl.
*B64D 35/08* (2006.01)
*B64D 31/06* (2006.01)
*B64D 27/02* (2006.01)

(52) U.S. Cl.
CPC .............. *B64D 35/08* (2013.01); *B64D 31/06* (2013.01); *B64D 2027/026* (2013.01); *B64D 2221/00* (2013.01)

(58) Field of Classification Search
CPC .. B64D 35/08; B64D 31/06; B64D 2027/026; B64D 2221/00; B64D 35/00; B64C 11/006; B64C 39/003

USPC .............................................. 244/60, 53 R, 70
See application file for complete search history.

(56) References Cited

U.S. PATENT DOCUMENTS

| | | | |
|---|---|---|---|
| 2010/0038473 A1* | 2/2010 | Schneider .............. | B64D 27/24 244/60 |
| 2010/0064689 A1* | 3/2010 | Reinhardt .............. | B64D 27/24 60/706 |
| 2012/0197475 A1* | 8/2012 | Akutsu .................... | B60K 6/26 701/22 |
| 2013/0227950 A1* | 9/2013 | Anderson .............. | B64D 27/24 60/718 |
| 2014/0010652 A1* | 1/2014 | Suntharalingam ..... | B64D 27/02 416/1 |
| 2016/0265631 A1* | 9/2016 | Strashny ................ | B63H 21/20 |
| 2017/0225573 A1* | 8/2017 | Waltner ................. | B64C 27/12 |

* cited by examiner

*Primary Examiner* — Justin M Jonaitis

(57) ABSTRACT

A parallel hybrid-electric aircraft engine that provides power for takeoff and climb by combining the output power of an electric motor with that an internal combustion engine and then converting the electric motor to a generator once the additional power of the electric motor is no longer needed.

3 Claims, 6 Drawing Sheets

PARALLEL HYBRID-ELECTRIC AIRCRAFT ENGINE

RELATED APPLICATIONS

The present application is a continuation-in-part application of U.S. provisional patent application, Ser. No. 62/375,171, filed Aug. 15, 2016, for PARALLEL HYBRID-ELECTRIC AIRCRAFT ENGINE, by Marinus Bernard Bosma, included by reference herein and for which benefit of the priority date is hereby claimed.

FIELD OF THE INVENTION

The present invention relates to hybrid power plants and, more particularly, to a parallel hybrid-electric powerplant aircraft engine.

BACKGROUND OF THE INVENTION

Aircraft go through phases of flight, commonly, takeoff, climb, cruise, descent and landing. For the takeoff and climb portion of the flight the aircraft engine is required to generate enough horsepower to accelerate and lift the aircraft to altitude. The physics of the problem is that power is needed to accelerate the mass of the aircraft and then once free from the runway additional power is needed to lift the aircraft against the force of gravity. Once at a given altitude and no longer climbing or accelerating the engine need only overcome the drag on the aircraft. This disproportionate power requirement means the aircraft needs to have a large powerplant that can perform the functions of accelerate and climb but then reduce power to that required to maintain level flight.

The amount of power delivered by the typical engine is proportional to its weight. Therefore, an engine capable of getting an aircraft to it's cruise altitude would be heavier than an engine used to maintain level flight. The additional weight of the powerful engine, then must be carried by the aircraft even though it's not yielding power from the additional weight.

An engine that can be both lightweight and powerful would allow this.

Serial Hybrid-Electric Aircraft engines which are a generator to provide power via wires to an electric motor turning a propeller.

Serial Hybrid-Electric Aircraft engines can fail if the generator fails and battery power is lost. Serial Hybrid-Electric Aircraft engines can fail if the circuit between the generator and the propeller motor breaks. Serial Hybrid-Electric Aircraft engines can fail if the motor fails. Serial Hybrid-Electric Aircraft engines can fail if the engine on the generator fails. would be advantageous to provide an aircraft powerplant that can accelerate an aircraft to takeoff speed.

It would also be advantageous to provide an aircraft powerplant that can provide excess horsepower for climb.

It would further be advantageous to provide aircraft powerplant that throttle back to that power necessary for cruise flight.

It would further be advantageous to provide aircraft powerplant that has good fuel economy by operating at maximum efficiency power settings.

It would further be advantageous to provide aircraft powerplant that uses two different sources of power as a backup if one or the other fails.

SUMMARY OF THE INVENTION

In accordance with the present invention, there is provided a parallel hybrid-electric aircraft engine that provides power for takeoff and climb by combining the output power of an electric motor with that an internal combustion engine and then converting the electric motor to a generator once the additional power of the electric motor is no longer needed.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
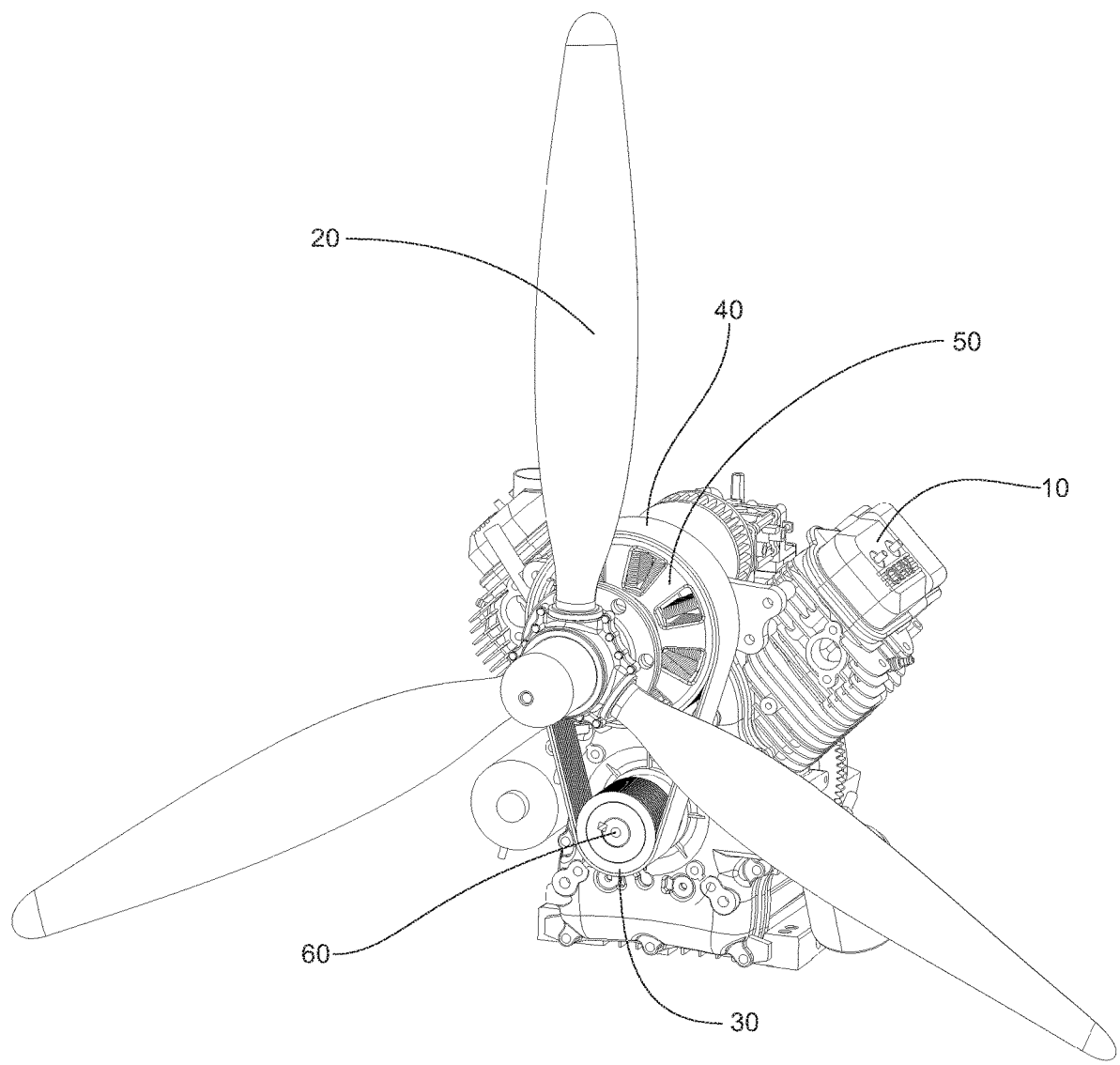
FIG. 1 is a front perspective view of a parallel hybrid-electric aircraft engine.
Figure 2:
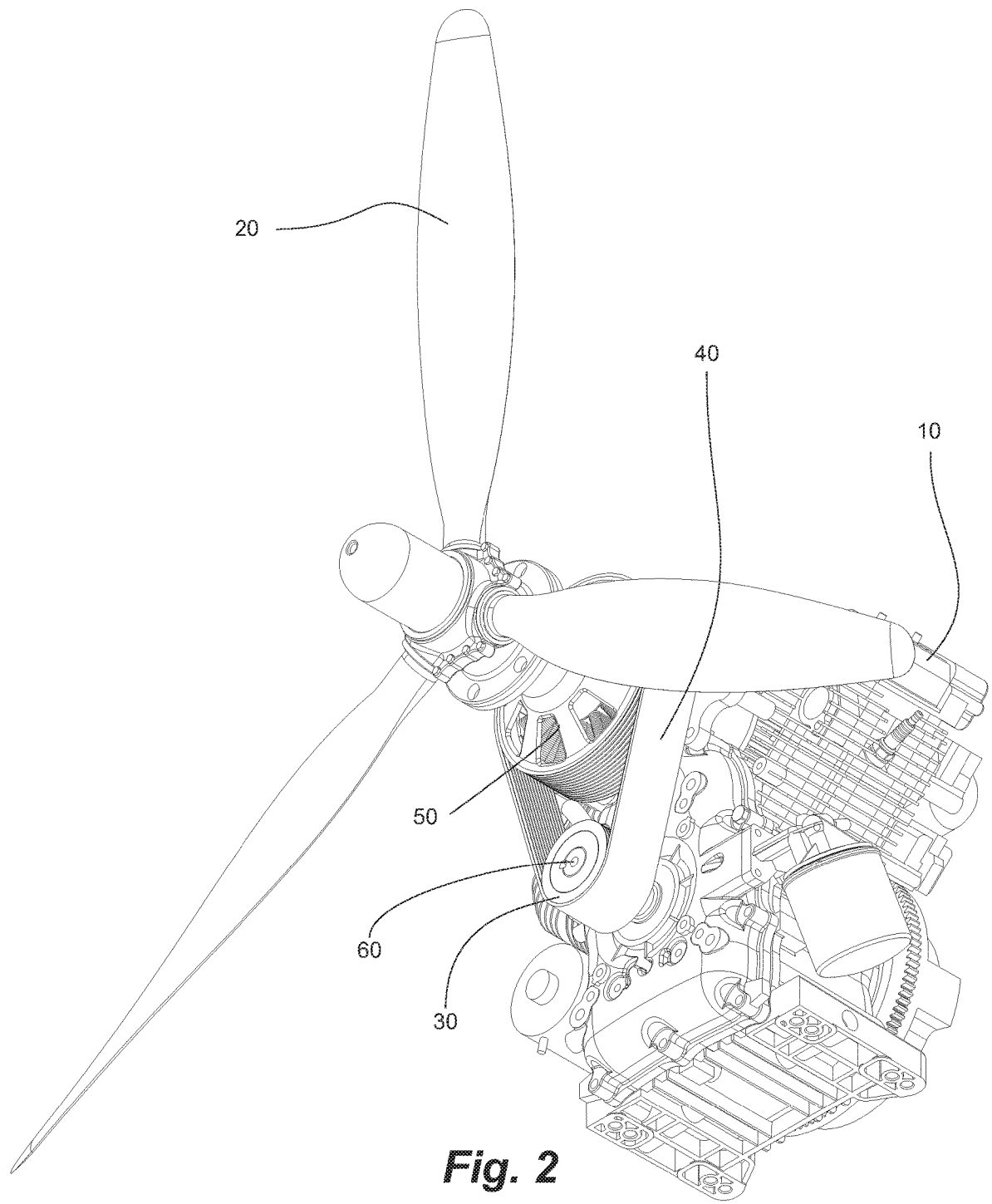
FIG. 2 is a lower perspective view of a parallel hybrid-electric aircraft engine.
Figure 3:
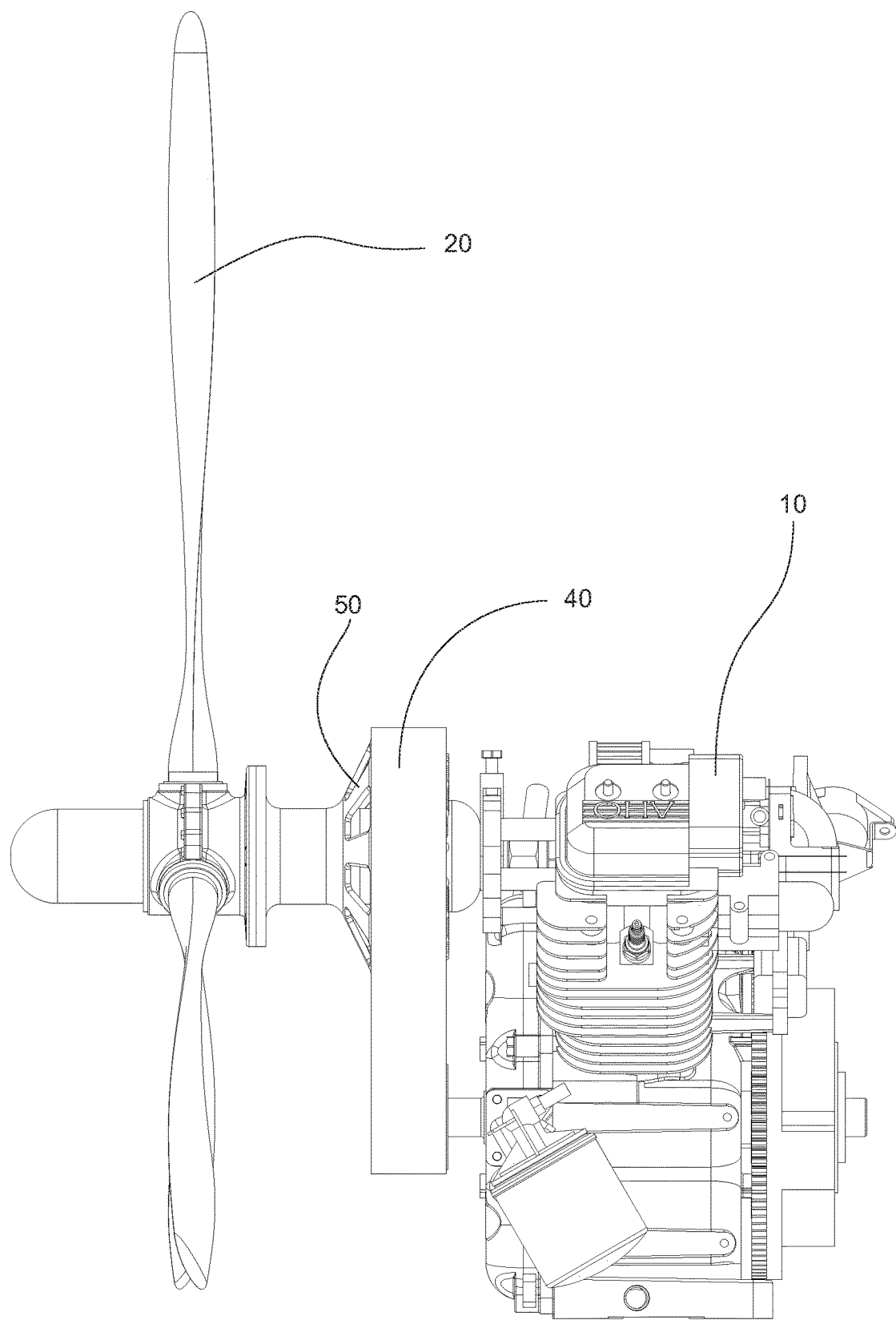
FIG. 3 is a left view of a parallel hybrid-electric aircraft engine.
Figure 4:
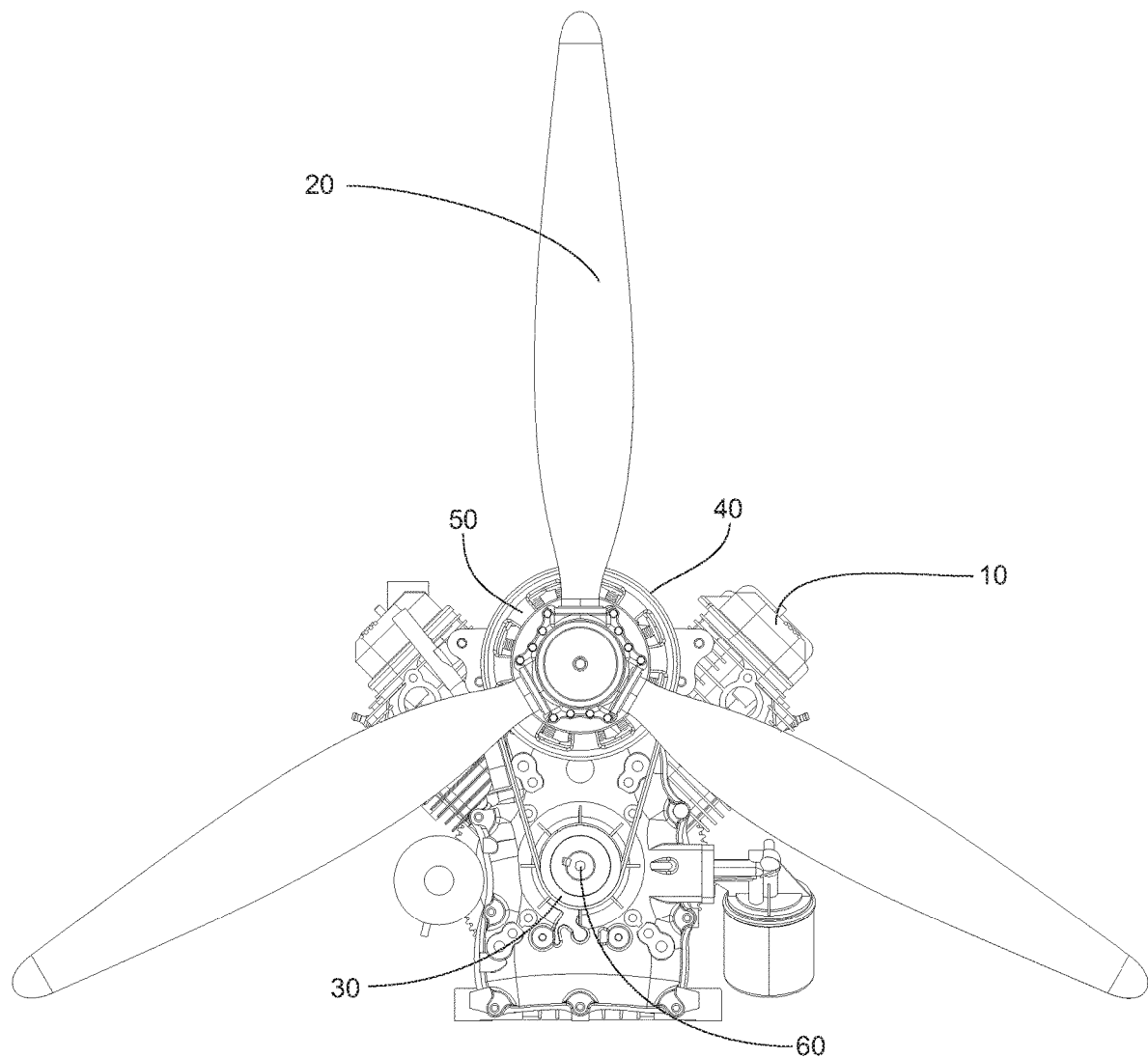
FIG. 4 is a front view of a parallel hybrid-electric aircraft engine.
Figure 5:
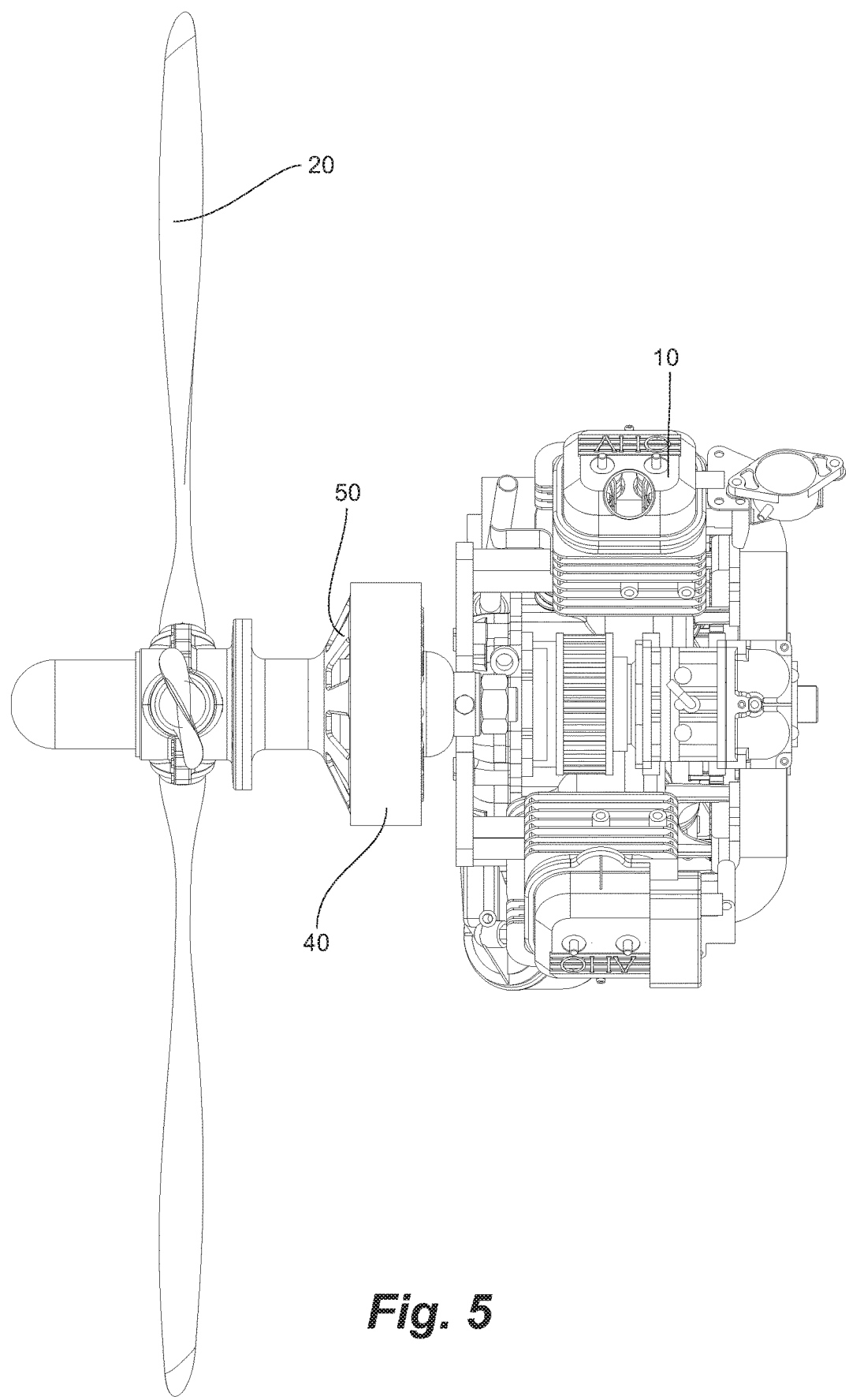
FIG. 5 is a top view of a parallel hybrid-electric aircraft engine.
Figure 6:
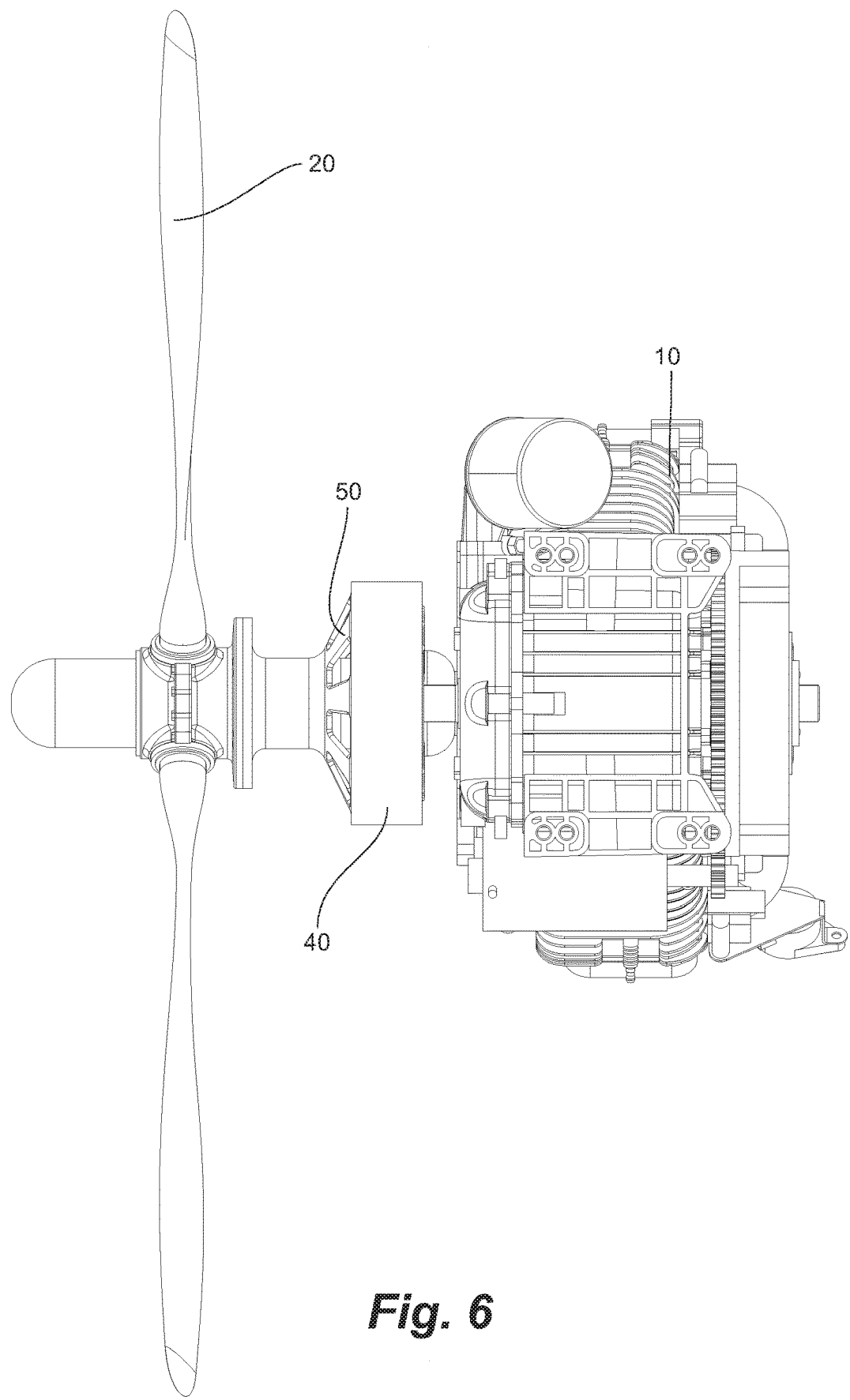
FIG. 6 is a bottom view of a parallel hybrid-electric aircraft engine.

FIG. 1 is a perspective view of a hybrid-electric aircraft engine consisting of an internal combustion engine 10, sprag clutch 30, flexible belt 40, electric motor 50 and propeller 20. FIG. 2 is a lower perspective view of parallel hybrid electric engine showing the internal combustion engine 10, sprag clutch 30, flexible belt 40, electric motor 50 and propeller 20. FIG. 3 is a left side view of a parallel hybrid-electric aircraft engine showing an internal combustion engine 10, flexible belt 40, electric motor 50 and propeller 20. FIG. 4 is a front view of a parallel hybrid-electric aircraft engine showing an internal combustion engine 10, sprag clutch 30, flexible belt 40, electric motor 50, engine output shaft 60 and propeller 20. FIG. 5 is a top view of a parallel hybrid-electric aircraft engine showing an internal combustion engine 10, flexible belt 40, electric motor 50 and propeller 20. FIG. 6 is a bottom view of a parallel hybrid-electric aircraft engine showing an internal combustion engine 10, flexible belt 40, electric motor 50 and propeller 20.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:
1. A parallel hybrid aircraft engine system, comprising;
a variable pitch propeller having a propeller shaft;
an out-runner electric motor, receiving the propeller shaft and enabled to transmit rotary power to the propeller shaft;

a gasoline or diesel internal combustion engine having an engine output shaft and enabled to transmit power to the propeller shaft;

an over-running sprag clutch receiving the engine output shaft; and a flexible belt providing a connection between the sprag clutch and the electric motor providing translation of power from the engine output shaft to the electric motor and thereby to the propeller shaft via the sprag clutch and flexible belt;

wherein the electric motor is positioned between the propeller shaft and the sprag clutch, the engine output shaft is positioned between the sprag clutch and the internal combustion engine and both the electric motor and the internal combustion engine transmit power to the propeller shaft in parallel via the connection between the sprag clutch and the electric motor via the belt, providing power for takeoff and climb.

2. The system of claim 1, wherein the sprag clutch disengages from the engine output shaft in an event of a failure of the internal combustion engine.

3. The system of claim 1, wherein the electric motor is enabled to switch to a generator to provide power for accessories and to recharge the batteries.

\* \* \* \* \*